United States Patent [19]
Vanderwerf

[11] Patent Number: 5,774,832
[45] Date of Patent: Jun. 30, 1998

[54] INERTIAL NAVIGATION WITH GRAVITY DEFLECTION COMPENSATION

[75] Inventor: Kevin D. Vanderwerf, Hennepin, Minn.

[73] Assignee: Honeywell Inc., Minneapolis, Minn.

[21] Appl. No.: 633,978

[22] Filed: Apr. 19, 1996

[51] Int. Cl.[6] ............................ G01C 21/00; G01C 21/16
[52] U.S. Cl. ................ 701/220; 364/571.04; 364/571.03
[58] Field of Search ..................................... 701/220, 221;
73/1.38; 364/571.03, 571.04, 577; 33/320,
317 D; 707/101, 104

[56] References Cited

U.S. PATENT DOCUMENTS

| | | | |
|---|---|---|---|
| 3,803,916 | 4/1974 | Dematteo et al. | 73/382 |
| 4,123,019 | 10/1978 | Amberntson | 244/3.2 |
| 4,173,784 | 11/1979 | Heath et al. | 364/453 |
| 4,295,372 | 10/1981 | De Matteo et al. | 73/382 |
| 5,030,957 | 7/1991 | Evans | 342/357 |
| 5,112,126 | 5/1992 | Graebner | 356/152 |
| 5,136,227 | 8/1992 | Nakano et al. | 318/689 |
| 5,272,639 | 12/1993 | McGuffin | 364/449 |
| 5,339,684 | 8/1994 | Jircitano et al. | 73/178 R |
| 5,345,241 | 9/1994 | Huddle | 342/63 |
| 5,357,802 | 10/1994 | Hofmeyer et al. | 73/382 G |
| 5,402,340 | 3/1995 | White et al. | 364/420 |

OTHER PUBLICATIONS

Article "Antarctic Marine Gravity Field From High–Density Satellite Altimetry", Author David T. Sandwell from the Scripps Institution of Ocenography, La Jolla, CA, pp. 437–448; 1992.

Article "Gravity Compensation For Inertial Navigation Systems Demonstration Program", Administrative Report#1, CDRL Item #19, Prepared by Northrop Corporation, Electronics Division, Nov. 1983.

Article "Gravity Modeling For Airborne Applications" Author James A. Lowrey III and Glen Y. Oak, from Rockwell International, 1982 IEEE, pp. 46–55.

Article "Self–Contained Real Time Estimation and Compensation of Vertical Deflection in a Precise Marine Inertial Navigator" Author James A. Lowrey III, Glen Y. Oak and Paul F. Zavattero from Rockwell International, Jun. 1984, pp. 165–178 in the Jurnal of the Institute of Navigation, vol. 31, No. 3, Fall 1984.

B.A. Kriegsman et al.; *Gravity–Model Errors in Mobile Inertial–Navigation Systems*; Journal of Guidance Control and Dynamics; May–Jun. 1986; vol. 9, No. 3; pp. 312–318.

*Primary Examiner*—Michael Zanelli

[57] ABSTRACT

The novel navigation system, suited for commercial aircraft, includes a sensor for outputting a signal representing a first navigation parameter, a memory having condensed gravity compensation data, and a processor for deriving a second navigational parameter. The processor derives the second navigational parameter from the signal and a subset of the condensed compensation data based on aircraft position. The condensed memory, based on regional gravity deflections, stores sequential gravity compensation values and corresponding navigational coordinates. To conserve memory, adjacent compensation values differ by at least a preset gravity compensation increment. The compensation increment, based on a gravity deflection between 30 and 100 micro-radians, is adequate for commercial aircraft.

27 Claims, 3 Drawing Sheets

INERTIAL NAVIGATION WITH GRAVITY DEFLECTION COMPENSATION

BACKGROUND OF THE INVENTION

The present invention concerns the compensation of gravity deflections in navigation systems. It specifically concerns an inertial navigation system having a memory of gravity compensation values for compensating gravity deflections.

An inertial navigation system is a self-contained system that uses inertial sensors and a system processor to determine velocity and position of a vehicle. The inertial sensors, which typically include a set of accelerometers on the vehicle, measure linear acceleration of the vehicle. The system processor, usually a digital computer, integrates the acceleration data, according to classical Newtonian mechanics, to estimate velocity and position.

These estimates of velocity and position suffer from inherent limits to accuracy. Such limits stem not only from accelerometer bias and misalignment, but also from sensitivity limits inherent to the very nature of accelerometers. Accelerometers suffer particularly from an inability to distinguish vehicle acceleration from gravitational acceleration.

Instead of measuring vehicle acceleration, accelerometers measure the sum of vehicle acceleration and gravitational acceleration, or gravitation. The sum is known as specific force acceleration. As a result, determining the actual vehicle acceleration requires accounting for the effect of gravitation on the accelerometers. This accounting entails adding (or subtracting) a gravitation term to the outputs of the accelerometers and proceeding to calculate velocity and position, using the adjusted accelerations.

The gravitation term, used to adjust the accelerations, typically results from modeling the earth (or other celestial body) as an ellipsoid with a purely vertical gravitational field. Vertical means perpendicular to a plane tangent the ellipsoid. Thus, if the earth were a sphere, its purely vertical field would extend radially from its center. The magnitude of the field varies inversely with the square of distance from the earth. The earth's gravitational field, however, is much more irregular, or anomalistic, than the models suggest.

In reality, the earth's gravitational field not only varies magnitudinally according to distance from the earth but also directionally according to local geographic features. In other words, the earth's gravitational field (and indeed that of any imperfect celestial body) deviates from a strictly vertical direction, based on geographic anomalies, such as mountain ranges, ocean trenches, etc. These deviations from vertical are known as gravity deflections, vertical deflections, or gravity anomalies.

Gravity deflections, measured as North and East angles of deflection from the vertical, typically have magnitudes on the order of ten micro-radians ($\mu$rad). Although deflections of this order affect the accuracy of inertial navigation systems, the effect is generally thought negligible, particularly in commercial systems. Recent observations, however, have shown some terrestrial regions having gravity deflections large enough to seriously affect even commercial systems.

For example, the 34,000-feet-deep Kuril trench, stretching along the North Pacific airway between the U.S. and the Far East, generates gravity deflections exceeding 300 micro-radians. Deflections of this magnitude drive the velocity and position estimates of conventional inertial navigation systems outside acceptable performance bounds. As a consequence, vehicles using these systems are apt to weave, or oscillate, about their desired courses, wasting time and fuel in the process.

To meet these concerns, high-precision navigation systems have implemented various compensation schemes. These have included using statistical estimators to estimate the deflections, gravimeters to measure actual gravitation, and two-dimensional polynomial models to compute the deflections. Although these schemes improve accuracy, they are also quite costly in terms of computational overhead or hardware complexity, especially for the comparatively modest demands of commercial systems. Accordingly, an inertial navigation system with a simple cost-effective mechanism for compensating gravity deflections would advance the art of inertial navigation.

SUMMARY OF THE INVENTION

The present invention, a navigation system for mounting to a vehicle, comprises an inertial sensor for outputting a sensor signal representing a first navigation parameter of the vehicle, a memory having gravity compensation data for a terrestrial region, and a processor coupled to the inertial sensor and the memory. The processor accesses a subset of the gravity compensation data, based on position of the vehicle, and derives a second navigational parameter, based on the sensor signal and the subset of gravity compensation data.

The preferred gravity compensation data includes sequential gravity compensation values and navigational coordinates corresponding to subregions of the terrestrial region. To conserve memory, each compensation value differs from an adjacent compensation value by at least a preset gravity compensation increment. The increment is based on a gravity deflection between 30 and 100 micro-radians.

Another aspect of the invention is a method of condensing, or compressing, the gravity compensation data. The method includes storing gravity compensation values, having associated navigational coordinates, to a first memory, and storing a first gravity compensation value to a compensation memory. The next steps entail searching the remaining compensation values for the nearest compensation value that differs from the first value by at least a preset gravity compensation increment, and then storing this value to the compensation memory. The preferred method further includes storing the associated navigational coordinates to the compensation memory and searching for other values that differ from the last stored compensation value by at least the preset increment.

DETAILED DESCRIPTION OF THE PREFERRED EMBODIMENTS

Figure 1:
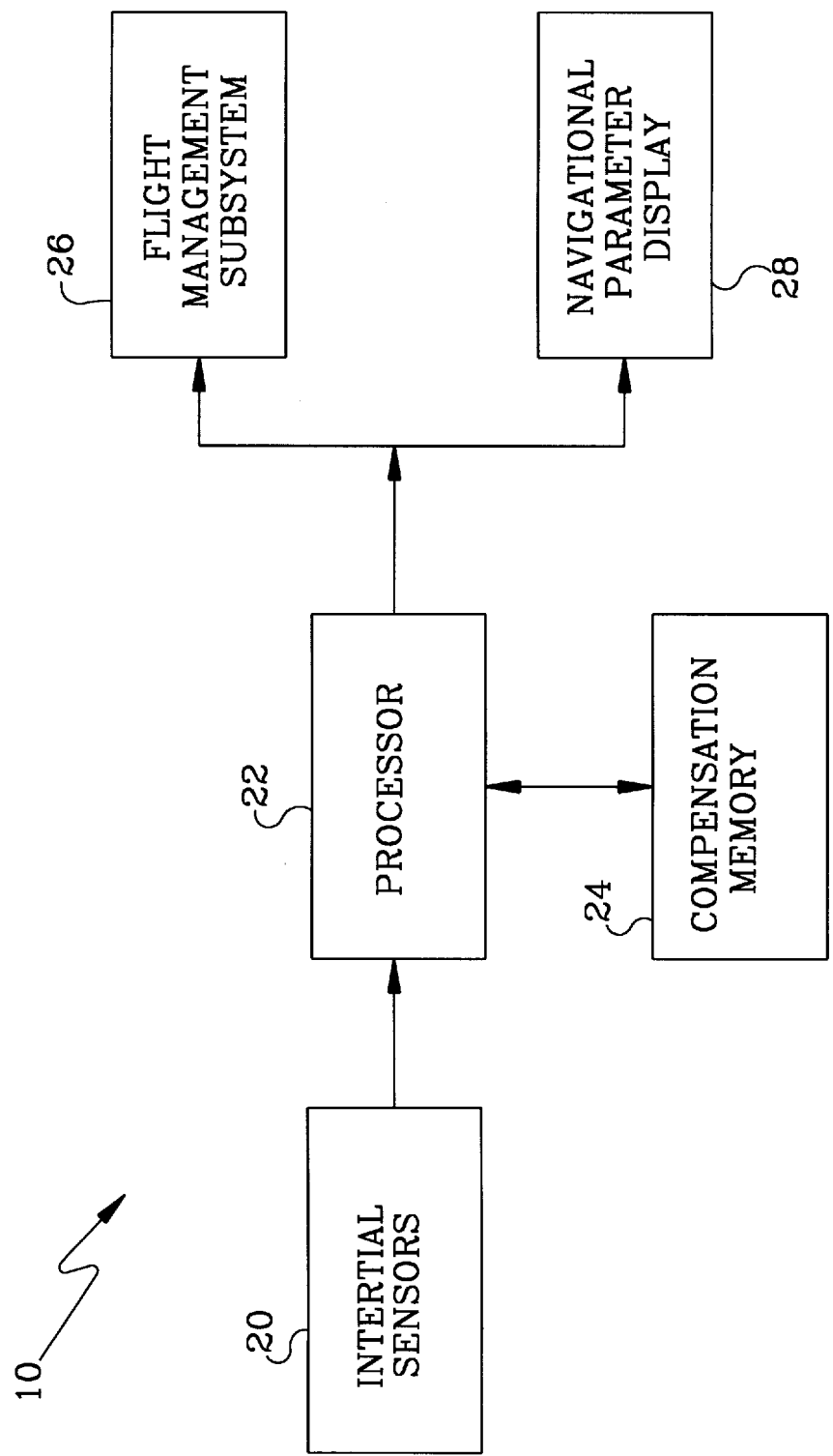
FIG. 1 shows the inertial navigation system of the present invention.

FIG. 1 shows a block diagram of inertial navigation system 10, according to the present invention. Navigation system 10, mounted in an aircraft (not shown), comprises inertial sensors 20, processor 22, compensation memory 24, flight management subsystem 26, and navigational parameter display 28.

In operation, inertial sensors 20, which include a set of accelerometers and gyroscopes, measure aircraft acceleration and angular rotational rates and output signals representing the sensed accelerations and angular rates to processor 22. Processor 22, preferably an Intel 80960, uses the accelerations and angular rates to estimate velocity, position, attitude, and heading of the aircraft. To compensate for gravity deflections, processor 22 accesses compensation memory 24.

Compensation memory 24, preferably an embedded non-volatile memory, contains map-like compensation data based on the gravity deflections of a geographic region. Processor 22 searches memory 24 for data corresponding to position of the aircraft, interpolates this data to the position, and compensates the velocity and position estimates. Processor 22 then outputs the compensated parameters to flight management system 26 and navigational parameter display 28. Management system 26, which monitors the actual path of the aircraft against its desired flight path, computes time and distance from various milestones, fuel consumption estimates, etc. Navigational display 28 presents the navigational parameters to the crew of the aircraft.

Figure 2:
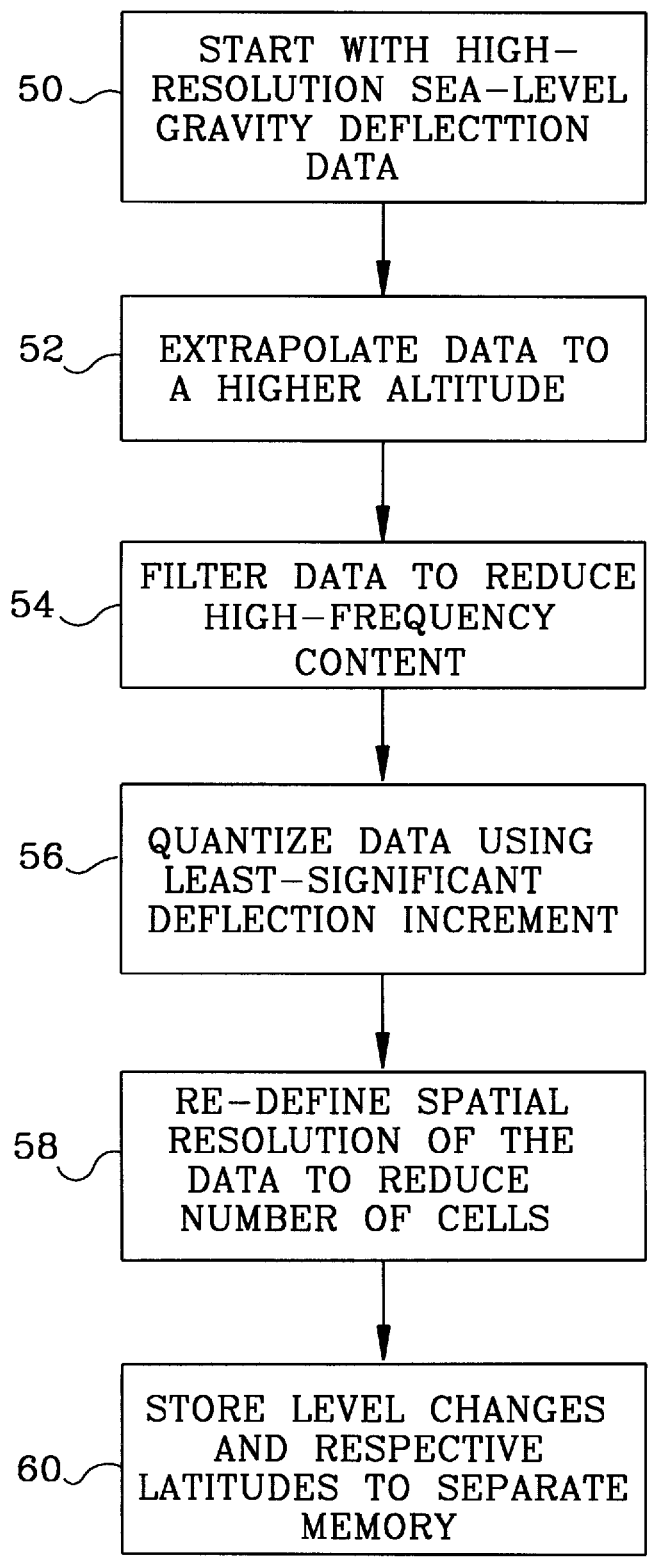
FIG. 2 illustrates the method of condensing regional gravity deflection data of the present invention.

The present invention, therefore, provides a navigation system with a simple mechanism, i.e., a look-up table, to use in compensating gravity deflections. Moreover, unlike the complex and computationally burdensome prior art schemes, the present system, is particularly suitable for commercial aircraft applications. However, for applications where the size of memory 24 may be problem, memory 24 preferably includes gravity compensation data that is condensed (compressed or abridged), according to the method illustrated in FIG. 2.

The method, as shown at step 50, begins with a high-resolution database containing map-like gravity compensation data based on sea-level north and east gravity deflections for a specific geographic region. The database, resembling a logical matrix or grid, has addressable memory cells corresponding to subregions of the geographic region, each cell storing a gravity compensation value for its respective region. The gravity compensation values, based on actual or estimated deflection data, may assume the form of incremental accelerations, velocities, or positions.

The preferred database models a geographic region, extending between ±180° longitude and ±72° latitude, as a number of rectangular 0.05° longitude ×0.05° latitude subregions. It also stores a north gravity compensation value equal to the north deflection and an east gravity compensation value equal to the east deflection, for each subregion. The deflections, stored with a magnitude resolution of 1 $\mu$rad (approximately 1 $\mu$g), stem from a spherical harmonic series model of actual gravity field measurements. A paper by David T. Sandwell, incorporated herein by reference and entitled "Antarctic Marine Gravity Field from High Density Satellite Altimetry," describes this model in greater detail. See Geophysical Journal International, vol. 109, pp. 437–48 (1992).

Step 52 requires extrapolating the high-resolution sea-level data to a specific altitude matching the expected operating conditions of the aircraft. The preferred altitude is 35,000 feet, a common flying altitude for commercial airliners. Extrapolating the data to a higher altitude also reduces its high-frequency (high spatial frequency) content.

Step 54 requires filtering, or smoothing, the data to further reduce its high-frequency content. (Filtering the data is helpful, because of inaccuracy in the position estimate used for accessing compensation values and because it facilitates use of a coarser grid spacing.) The preferred filter substantially attenuates wavelengths less than 60 nautical miles. There are many known ways to filter two-dimensional data. Those that implement lowpass filters, such as that preferred here, generally implement some form of integration, or weighted averaging, of the data. (See Sandwell for more details.)

Step 56 entails quantizing the data, according to a preset least-significant gravity compensation increment and a preset number of bits. For example, the preferred embodiment uses 3 bits for each north and east compensation value, with the least-significant increment based on a deflection between 30 and 100 micro-radians, such as 80 micro-radians. The 30–100 micro-radian range is suitable for the demands of commercial navigation systems.

Step 58 entails redefining, or resampling, the database, using a coarser spatial resolution to reduce the number of subregions and corresponding number of cells representing the region. To this end, one could recompute the compensation values with the spherical harmonic series model and a larger spatial increment, or replace groups of cells with single cells having compensation values based on its constituent cells. However, the preferred redefinition simply "overlays" a coarser grid on the high-resolution grid, assigning each cell of the coarser grid the value from the closest cell of the high-resolution grid.

More particularly, it redefines the 0.05°×0.05° subregions to larger 0.4°×0.28125° subregions, not only to reduce the number of cells but also to avoid aliasing. This spacing avoids aliasing, because the redefined longitudinal and latitudinal spacing is less than one half the longest significant wavelength in the data. The resulting grid, or matrix, has 900 longitudinal columns and 512 latitudinal rows (460,800 cells), representing the geographic region between ±180° longitude and ±72° latitude.

Step 60, the final step of condensing the data, requires searching each longitudinal column for level changes in the compensation values and storing the level changes and their corresponding latitudes in a compensation memory, such as memory 24. For example, consider a longitudinal column with 5 cells: (1) 0°, 80 $\mu$rad; (2) 10°, 80 $\mu$rad; (3) 20°, 160 $\mu$rad (4) 30°, 160 $\mu$rad; and (5) 40°, 160 $\mu$rad, each cell having a compensation value which is a multiple of an 80-$\mu$rad gravity compensation increment.

Condensing entails storing the first cell (its coordinate and its compensation value) of each column in the compensation memory and searching the remainder of the column for the next, or closest, cell with a gravity compensation value significantly different from the first. In the example, cell 1, which has a value of 80 $\mu$rad, is stored to the compensation memory, and cell 3, the closest cell (in terms of latitude) with a different value, i.e., 160 $\mu$rad, is the next cell stored to the memory.

Condensing continues by searching the remainder of the column for the next value different from cell 3, the last value stored to the memory. In the example, the remaining cells 4 and 5 have values of 160 $\mu$rad, the same as cell 3; hence, they are not stored to the compensation memory. Thus, condensing the sample column yields a new longitudinal column with only two cells: (1) 0°, 80 $\mu$rad and (2) 20°, 160 $\mu$rad, thereby reducing the 5-cell column to 2 cells.

Repeating this process for each longitudinal column (for both North and East compensation values) yields a memory savings dependent on the magnitude of the least-significant compensation increment and the terrain of the geographic region. Columns corresponding to fairly constant terrain are likely to condense to a single cell, whereas columns corresponding to mountainous terrain are likely to condense to scores of cells, depending on the compensation increment.

Condensing each of the 900 columns in the preferred database yields condensed columns with an average of 5 cells, or 4500 cells in total. 4500 cells compares favorably to the pre-condensed total exceeding 400,000. Each cell consumes two (8-bit) bytes, since each North and East deflection uses 3 bits, and the navigational coordinate preferably uses 9 bits. (Note that longitudinal coordinates are not stored directly, but inferred from the number of longitudinal columns and the size of the geographic region.) Thus, the compensation memory, for the geographic region between ±180° longitude and ±72° latitude, requires only 9 Kbytes.

Figure 3:
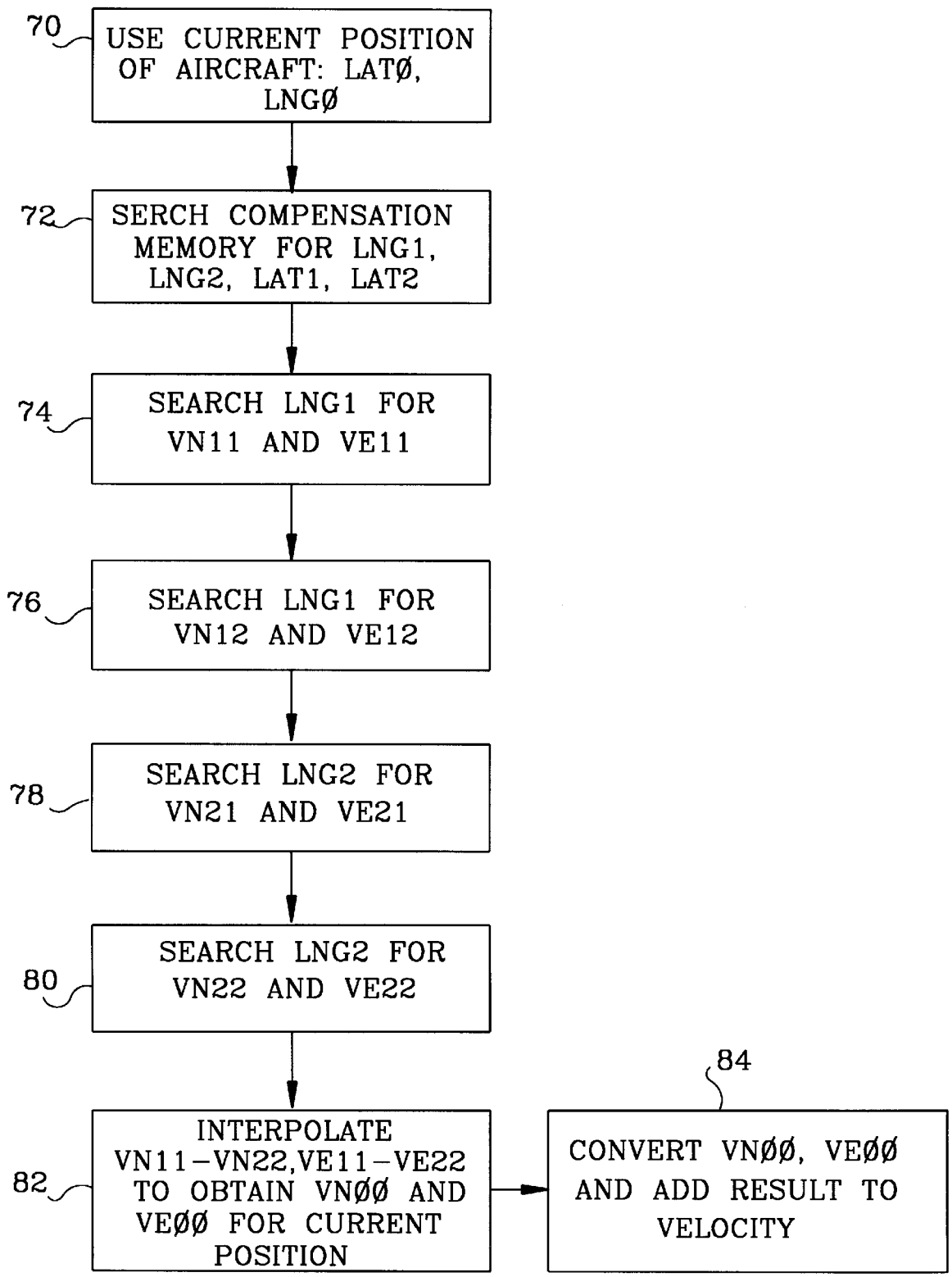
FIG. 3 illustrates the method of operation of the inertial navigation system of the present invention.

FIG. 3 shows how processor 22 cooperates with a compensation memory condensed according to the preferred method. The compensation method begins at step 70 with the current position of the aircraft, preferably expressed in terms of longitude (LNG0) and latitude (LAT0).

In steps 72–78, processor 22 searches the compensation memory for a subset of compensation values, based on position of the aircraft (LNG0, LAT0). In step 72, the processor looks for the two nearest longitudinal columns (LNG1, LNG2) bracketing the present longitude LNG0 and the two nearest latitudinal rows (LAT1, LAT2) bracketing the present latitude LAT0. Thus, the LNG1 and LNG2 columns and the LAT1 and LAT2 rows define a "box" around the present position LNG0, LAT0.

In steps 74 and 76, the processor searches the cells of column LNG1 for a cell corresponding to latitude LAT1 and a cell corresponding to latitude LAT2. These cells define the compensation values at the two left corners of the box (assuming that LNG1 is to the left, or west, of the LNG0). After finding the cells, the processor reads their north and east values: VN11, VE11 from the LAT1 cell and VN12, VE12 from the LAT2 cell.

In steps 78 and 80, the processor, looking for the two right corners of the box, searches LNG2 for a cell corresponding to latitude LAT1 and a cell corresponding to latitude LAT2. The processor reads the north and east values of each entry: VN21, VE21 from the LAT1 entry and VN12, VE12 from the LAT2 entry.

After completing the search, the processor executes steps 82 and 84. In step 82, it interpolates the four north values and the four east values to estimate respective north and east compensation values for the present position. There are many interpolation schemes, both linear and nonlinear (e.g., cubic-spline), which are compatible with the present invention.

The preferred interpolation entails linearly interpolating between the left corner values VN11, VN12 and between the right corner values VN21 and VN22, using present latitude LAT0 to determine two intermediate values: VN10 at LNG1, LAT0 and VN20 at LNG2, LAT0. The processor then linearly interpolates between VN10 and VN20, using present longitude LNG0, to determine VN00, the north compensation value corresponding to position LNG0, LAT0. The processor determines VE00, the east compensation value, using a similar procedure.

In step 84, it transforms the VN00 and VE00 values into an appropriate coordinate system and preferably converts them into two equivalent horizontal acceleration, velocity, or position increments, as necessary to compensate the particular parameter or parameters of interest. In the preferred embodiment, VN00 and VE00, which are the gravity deflection angles of the present position, are converted into north and east horizontal velocity increments. Since 1 μrad is approximately 1 μg of acceleration, the conversion only requires integrating the deflections (over time) to derive north and east horizontal velocity increments.

To complete the compensation process, the processor adds the horizontal velocity increments to the current estimates of the aircraft north and east velocities, thereby compensating aircraft velocity for the gravity deflections corresponding to position LNG0, LAT0. Since position derives from the compensated velocity, it is likewise compensated for the gravity deflections.

The compensation preferably proceeds at two process rates. The horizontal velocity increments are preferably updated every 5 seconds, using a new position for accessing the compensation memory, etc. This rate is suitable, since the rate of change of gravity deflections is generally much slower than the rate of change of position, i.e., velocity of the aircraft. The final step of adding the velocity increments occurs 50 times a second, the preferred parameter update rate of the navigation system.

In sum, the present invention provides a navigation system with a condensed, or compressed, memory of gravity compensation data for compensating navigational parameters. The novel condensed memory enables simple and efficient gravity deflection compensation, without the cost and complexity of prior compensation schemes.

Although the present invention has been described with reference to preferred embodiments, workers skilled in the art will recognize that changes may be made in form and detail without departing from the spirit and scope of the invention.

What is claimed is:

1. A navigation system for mounting to a vehicle, the system comprising:
    an inertial sensor for sensing a first navigational parameter of the vehicle and outputting a sensor signal representing the first parameter;
    a memory having gravity compensation data for a geographic region; and
    a processor coupled to the inertial sensor and the memory, the processor including:
        means for accessing a subset of the gravity compensation data, based on position of the vehicle; and
        means for deriving a second navigational parameter, based on the sensor signal and the subset of gravity compensation data.

2. The system of claim 1
    wherein the geographic region includes an ordered sequence of rectangular subregions having a common longitude, a respective latitude, and a respective gravity deflection; and
    wherein the gravity compensation data includes a plurality of sequential gravity compensation values, each value based on a gravity deflection of a subregion of the plurality and differing from an adjacent value by at least a preset gravity compensation increment.

3. The system of claim 2 wherein the preset gravity compensation increment is based on a gravity deflection with a magnitude between 30 and 100 micro-radians.

4. The system of claim 2 wherein the gravity compensation data includes a plurality of sequential latitudes, each latitude corresponding to the respective latitude of a subregion of the plurality of rectangular subregions.

5. The system of claim 4 wherein each gravity compensation value is paired with its respective latitude.

6. The system of claim 4
wherein the means for accessing a subset of the gravity compensation data includes means for searching the plurality of sequential latitudes for a set of latitudes corresponding to a latitude of the vehicle; and
wherein the means for deriving the second navigational parameter includes:
means for interpolating a new gravity compensation value from the subset of gravity compensation values; and
means for adding the new gravity compensation value to the first navigational parameter.

7. The system of claim 1 wherein the inertial sensor is an accelerometer, the first navigational parameter is an acceleration, and the second navigational parameter is a velocity.

8. The system of claim 1 wherein the second navigational parameter is a position.

9. The system of claim 1 wherein the gravity compensation data is condensed.

10. The system of claim 9 wherein the gravity compensation data includes a plurality of sequential gravity compensation values, each value based on a gravity deflection of a subregion of the geographic region and each value differing from an adjacent value.

11. The system of claim 10 wherein each value differs from an adjacent value by at least a preset gravity compensation increment.

12. The system of claim 11 wherein the preset gravity compensation increment is based on a gravity deflection having a magnitude between 30 and 100 micro-radians.

13. The system of claim 11 wherein the gravity compensation data includes a plurality of sequential navigation coordinates, each coordinate corresponding to a value of the plurality of sequential gravity compensation values.

14. The system of claim 1
wherein the region includes an ordered sequence of rectangular subregions having a common longitude, a respective latitude, and a respective gravity deflection; and
wherein the gravity compensation data includes a plurality of sequential gravity compensation values, each value based on a gravity deflection of at least one of the subregions, the plurality including:
a first value based on the gravity deflection of a first subregion of the plurality;
a second value based on the gravity deflection of the nearest subregion having a gravity deflection different from that of the first subregion; and
a third value based on the gravity deflection of the second nearest subregion having a gravity deflection different from that of the second value.

15. The system of claim 1 further including:
a flight management system coupled to the processor; and
a navigational display coupled to the processor.

16. A method of condensing gravity compensation data for use in a navigation system having a compensation memory, the method comprising:
storing a plurality of sequential gravity compensation values to a first memory, each value having an associated navigational coordinate corresponding to a geographic region;
storing a first gravity compensation value of the plurality to a first location of the compensation memory;
searching the plurality of values for a nearest different sequential value, the nearest different sequential value differing from the first value by at least a preset gravity compensation increment; and
storing the nearest different sequential value to a second location of the compensation memory.

17. The method of claim 16 further including:
storing the navigational coordinate associated with the first value to the first location; and
storing the navigational coordinate associated with the nearest different sequential value to the second location.

18. The method of claim 17 further including:
(1) searching the plurality of values for a second nearest different sequential value, the second nearest different value differing from the previous nearest different sequential value by at least the preset gravity compensation increment;
(2) storing the second nearest different sequential value and its associated navigational coordinate to another location of the compensation memory; and
(3) repeating steps (1) and (2) successively, until step (1) reaches a last value of the plurality of sequential gravity compensation values.

19. The method of claim 16 wherein storing the plurality of sequential gravity compensation values includes filtering the plurality to reduce high-frequency content.

20. The method of claim 16 wherein storing the plurality of sequential gravity compensation values includes quantizing the gravity compensation values, based on the preset gravity compensation increment.

21. The method of claim 16 wherein storing the plurality of sequential gravity compensation values includes reducing the number of values in the plurality of gravity compensation values.

22. The method of claim 16 wherein the preset gravity compensation increment is based on a gravity deflection having a magnitude between 30 and 100 micro-radians.

23. A method of compensating gravity deflection in a navigation system having a sensor for determining a navigational parameter of a vehicle, the method comprising:
storing a plurality of sequential gravity compensation values to a compensation memory, each value having an associated navigational coordinate corresponding to a region of earth;
accessing a subset of the plurality of gravity compensation values, based on position of the vehicle; and
compensating the navigational parameter, based on the subset of gravity compensation data.

24. The method of claim 23
wherein accessing a subset of the gravity compensation values includes searching for gravity compensation values corresponding to regions near the position of the vehicle; and
wherein compensating the navigational parameter includes:
interpolating the subset of the plurality of gravity compensation values to determine a gravity compensation value for the position of the vehicle; and
adding the gravity compensation value to the navigational parameter.

25. The method of claim 24 wherein storing the plurality of sequential gravity compensation values to the compensation memory includes:
storing a first gravity compensation value of the plurality and the navigational coordinate associated with the first value to a first location of the compensation memory;

searching the plurality of values for a nearest different sequential value, the nearest different sequential value differing from the first value by at least a preset gravity compensation increment; and storing the nearest different sequential value and the navigational coordinate associated with the nearest different sequential value to a second location of the compensation memory;

(1) searching the plurality of values for a second nearest different sequential value, the second nearest different value differing from the previous nearest different sequential value by at least the preset gravity compensation increment;

(2) storing the second nearest different sequential value and its associated navigational coordinate to another location of the compensation memory; and (3) repeating steps (1) and (2) successively, until step (1) reaches a last value of the plurality of sequential gravity compensation values.

26. The method of claim 23 wherein storing the plurality of sequential gravity compensation values includes:

filtering the plurality to reduce high-frequency content;

quantizing the gravity compensation data, based on the preset gravity compensation increment; and reducing the number of values in the plurality of gravity compensation values by redefining the regions of the plurality of regions.

27. The system of claim 23 wherein the preset gravity compensation increment is based on a gravity deflection having a magnitude between 30 and 100 micro-radians.

* * * * *